Nov. 11, 1947.      R. M. MILLER      2,430,525
COMBINATION GUIDE AND LABEL
Filed May 31, 1946

INVENTOR.
Roland M. Miller
BY
Morton S. Buckman

Patented Nov. 11, 1947

2,430,525

UNITED STATES PATENT OFFICE 2,430,525

COMBINATION GUIDE AND LABEL

Roland M. Miller, Bay Village, Ohio

Application May 31, 1946, Serial No. 673,510

1 Claim. (Cl. 32—32)

This invention relates generally to articles used in dental laboratories and by dentists, and particularly to devices which assist in identifying denture molds and which help to give such molds a pleasing, attractive and better appearance.

Conducive to a better understanding and appreciation of this invention, it should be pointed out that in the preparation for, and in the manufacture of, artificial teeth, crowns, or plates, the dentist in most cases prepares in his office wax molds of the patient's upper and lower teeth. From these molds a dental technician, very often in a distant laboratory, prepares plaster models of the teeth and mounts them on a device known as an articulator. The articulator may be made to simulate the normal motions of a human jaw, and it is therefore possible to see and analyse the biting ability, fit, and other characteristics of the artificial teeth eventually made from the plaster cast or mold mounted on the articulator. Such articulators are conventional and common, and well known in the dental profession, and they all look pretty much alike.

During this preliminary or fitting period the plaster model and the articulator is returned to the dentist for adjustments or corrections. It is, therefore, desirable for an outside laboratory to identify its models and articulators, not only so that they may be returned to them for further processing, but also to enhance the appearance of their models. It is also desirable and often necessary to further distinguish them from the models of other laboratories, and thereby avoid confusion and error.

It is, therefore, the primary object of this invention to provide a simple means for shaping the top surface and contour of a plaster model of a dental plate.

Another object is to provide a device which neatly forms a mark or trade-mark of the laboratory distinguishing its models and apparatus from those of other laboratories.

A further object is to provide a device which neatly forms a writing surface upon which a special indicia may be written to quickly and easily identify the various models in the laboratory itself.

Still another object is to provide an article of the type stated which is inexpensive to make and use, and which is quickly and easily applied to the plaster model during its formation.

A still further object is to provide such device with means for facilitating its physical attachment to, and engagement with, the plaster model as distinguished from simple attachment thereto by means of adhesive labels or by loose tags.

These and other objects of the invention will become apparent from a reading and study of the following description and claim together with the accompanying drawing wherein like parts are referred to and indicated by like reference characters and wherein:

Figure 1:
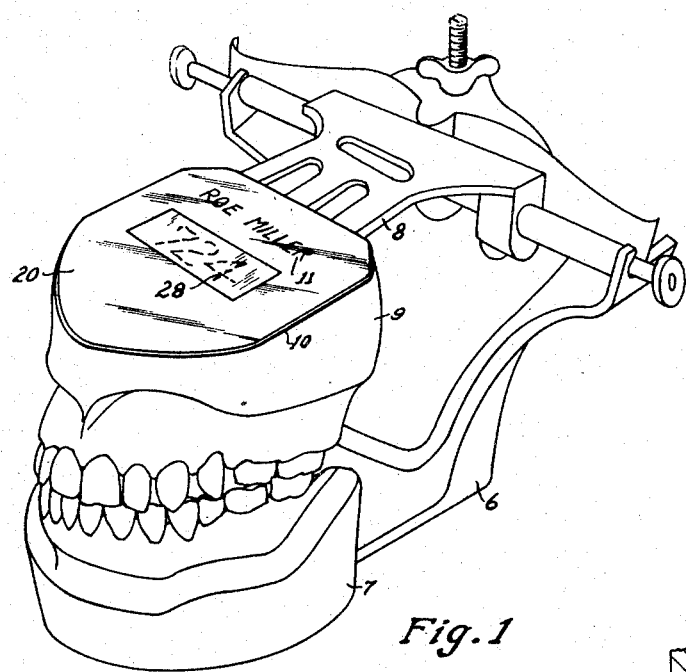
Figure 1 is a perspective view of an articulator and plaster models of upper and lower sets of teeth and the combination guide and label device constituting this invention mounted thereon.

Referring now to the drawing there is shown a conventional dental articulator having a fixed base portion 6, a plaster cast 7 of a lower set of teeth, and a movable support 8, having a plaster cast 9 of an upper set of teeth thereon.

The invention itself consists primarily of two layers or sheets of material broadly indicated by the reference characters 10 and 20.

The bottom sheet of material 10 is symmetrical and shaped somewhat like a figurative heart. It may assume any desired shape, however, the shape which conforms approximately to the outline of the human jaw, or something like the shape shown in the drawing, is suitable and practical. It is made of thin sheet material such as Celluloid, plastic, metal, wood, glass, cardboard, or any other suitable material. It has an aperture 12 therethrough which may be round, square, or rectangular as shown in the drawing.

The bottom sheet 10 also has a series of perforations or slots 11 arranged in an orderly manner to form a design, mark, or name, or any desired figure. In the drawing the perforations 11 form the name of the instant inventor. The color of the bottom sheet 10 should be different from the color of the plaster 9, for a reason that will soon become apparent.

The top sheet 20 is made of a transparent material such as Lucite or similar plastics, and should be about one-eighth of an inch thick. Its outline is the same as the outline of sheet 10, and it also has a similar aperture therethrough which aperture is indicated by the reference character 22. The aperture 22 is slightly larger than the aforesaid aperture 12, and is substantially concentric therewith. When the two sheets 10 and 20 are superimposed and cemented or bonded together as shown, the edge portion of the two apertures 12 and 22 form a small shoulder 14 therearound.

The outer marginal or peripheral edges 16 and 26 of the superimposed lower and upper sheets 10 and 20 are bevelled as shown, and the contrasting color of the bottom sheet 10 adds to the attractiveness of the device and adds further distinction thereto.

At this point it should be made clear that the combination guide and label need not be made of two laminated sheets of material. It may very well be molded or formed out of one piece of material. In the latter event the perforations forming the mark could be cut all the way through the material or simply embossed on the under side thereof. The central aperture could easily be formed with a small inner flange therearound corresponding with the shoulder 14 of the preferred form of the invention.

Figure 2:
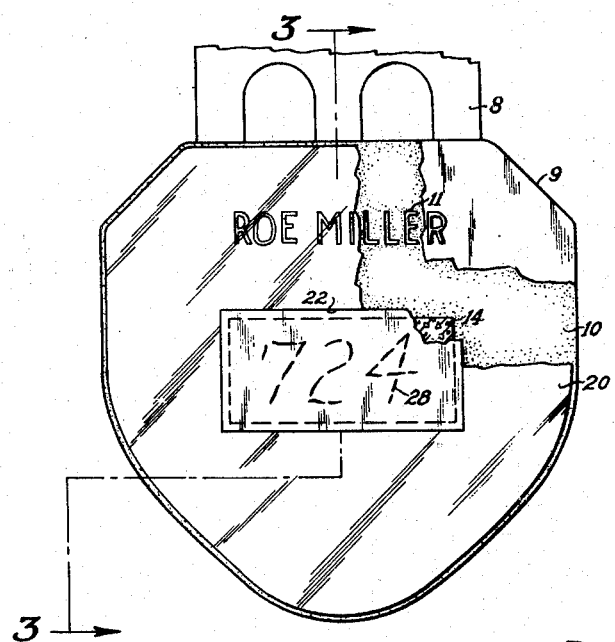
Figure 2 is an enlarged top plan view of the device, the plaster models and the articulator, with parts thereof broken away to show formation and construction.
Figure 3:
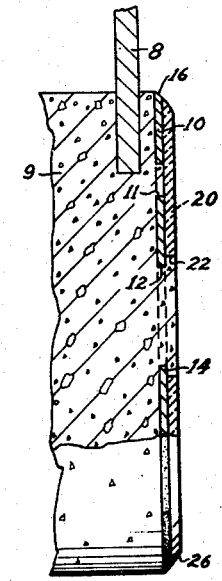
Figure 3 is a vertical cross-sectional view of the device taken along the line and in the direction of the arrows 3—3 of the Figure 2.

To use and apply the device, the laboratory technician who makes the plaster mold 9, simply lays one of the combination devices on the top of the model while the plaster is still soft and unset. He applies the sheets with the flange or shoulder 14 downward on the plaster 9. Slight pressure causes the soft plaster to arise through the concentric apertures 12 and 22 and flow over the shoulder or flange 14. The pressure causes the plaster to fill the perforations 11 as shown in the Figure 3. The technician then uses a knife edge or pallet to remove surplus plaster off the top surface of the device, and also runs the knife or pallet around the bevelled edge 16/26 to give shape to the plaster 9 as shown in the Figures 1 and 2 of the drawing.

When the plaster 9 hardens the overlap portion thereof in the aperture 12/22, on the flange or shoulder 14, firmly engages and retains the device on the model. It then can only be removed by fracturing the plaster 9 in the aperture. The plaster 9 in the perforations 11 is clearly visible through the top sheet 20, and the contrasting color of the plaster 9 and the lower sheet 10 is apparent through the top sheet 20.

The area of smooth exposed plaster at the aperture may be easily written on with pen or pencil, and provides an excellent surface for special instructions, notations, or indicia, such as the special indicia designated by the reference character 28 in the drawing.

Having thus disclosed the invention in its preferred form, it should be understood that there may be other forms or modifications of the invention which might also come within the scope of the claim herein, and that no limitations or restrictions are intended other than those imposed thereon by the following claim.

I claim:

In combination with a dental articulator of the type having a plaster top surface, an identifying device, comprising a first sheet of relatively opaque card-board having perforations and an aperture therethrough, the said first sheet being of a color contrasting the color of the plaster, the said perforations receiving the plaster and forming therewith a mark, and a second sheet of transparent material attached to the top surface of the first sheet and covering the perforations forming the mark, the said second sheet of material having an aperture therethrough larger than the aforesaid aperture in the first sheet and being concentric therewith, the combined first and second sheets forming at their concentric apertures a flanged opening receiving the plaster and forming a writing area, the said flanged opening engaging the plaster and causing the combined sheets to be firmly retained on the articulator.

ROLAND M. MILLER.

REFERENCES CITED

The following references are of record in the file of this patent:

UNITED STATES PATENTS

| Number | Name | Date |
| --- | --- | --- |
| 723,604 | Heartfield | Mar. 24, 1903 |
| 1,561,718 | Harmon | Nov. 17, 1925 |
| 2,083,872 | Siegel | June 15, 1937 |
| 2,315,338 | King | Mar. 30, 1943 |
| 2,354,857 | Gits et al. | Aug. 1, 1944 |